Nov. 3, 1936.   W. B. CONNOLLY ET AL   2,059,440
ELECTRIC TOASTER
Filed April 21, 1934   2 Sheets-Sheet 1

INVENTORS
WILLIAM B. CONNOLLY and
ABE O. SAMUELS
BY
ATTORNEY

Nov. 3, 1936.  W. B. CONNOLLY ET AL  2,059,440
ELECTRIC TOASTER
Filed April 21, 1934   2 Sheets-Sheet 2
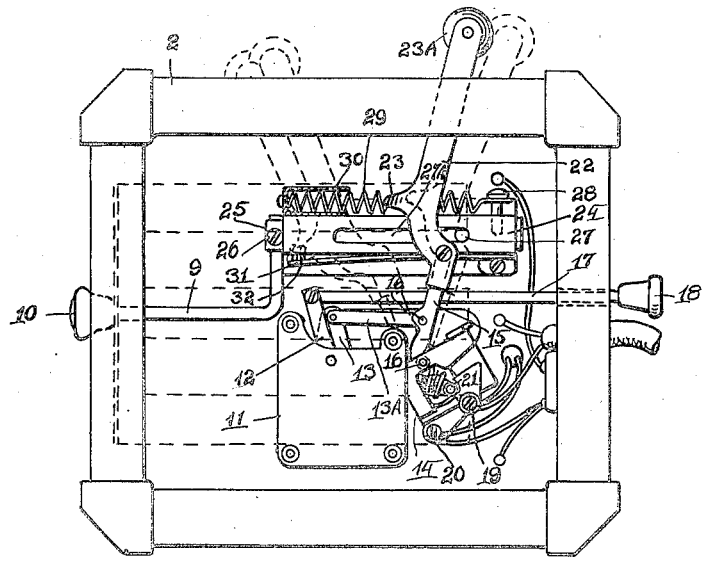
FIG. 4.
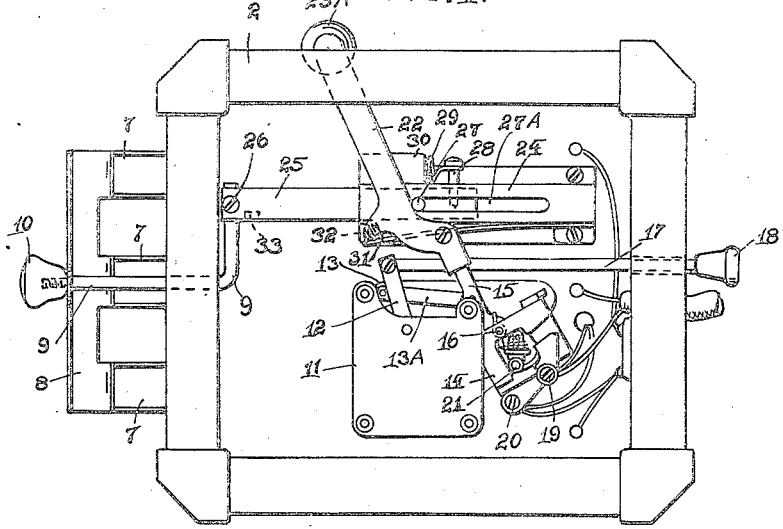
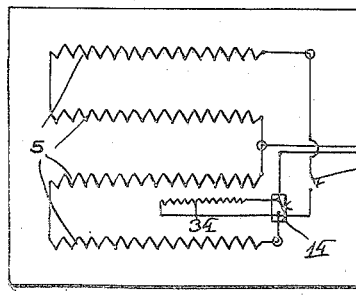
FIG. 6.
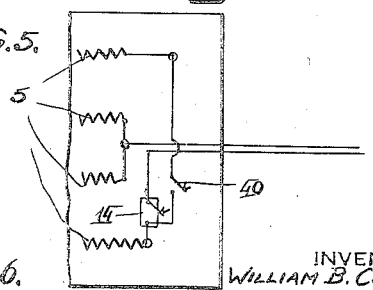
FIG. 5.
FIG. 7.
INVENTORS
WILLIAM B. CONNOLLY and
ABE O. SAMUELS
BY
ATTORNEY Patented Nov. 3, 1936

2,059,440

UNITED STATES PATENT OFFICE 2,059,440

ELECTRIC TOASTER

William B. Connolly and Abe O. Samuels, Rochester, N. Y., assignors to Samson-United Corporation, Rochester, N. Y.

Application April 21, 1934, Serial No. 721,738

12 Claims. (Cl. 219—19)

One object of this invention is to provide a multiple bread toaster of greatly simplified construction in which the toasting operation can be regulated at will for any desired kind of toast.

Another object of this invention is to provide a multiple bread toaster with means whereby the toast can be kept hot after the toasting operation is completed.

A further object of this invention is to provide a multiple bread toaster with a toast carrier which operates to partially eject the toast at will after the toasting operation is completed.

Another object of this invention is to provide the toast carrier with simplified releasing and moving means.

A further object of this invention is to provide the toast carrier with novel retarding means which keeps the toast from being forcibly ejected from the toast carrier on the movement thereof.

A further object of this invention is to so construct the toaster that the toasting chamber or oven is entirely separated from the operating mechanism of the toast carrier and the toast carrier is operated and moved from the outside of the oven.

All these and other objects and attendant advantages will become more readily apparent from the detailed description thereof which follows, reference being had to the accompanying drawings in which Figure 1 is a side elevation of our improved multiple bread toaster with a portion thereof broken away.

Figure 4 is a bottom plan view of the toaster showing the operating mechanism in its starting position.

Figure 5 is a similar view of the toaster showing the operating mechanism in its final operated position.

Figure 6 is a diagrammatic view of the electrical connections of the toaster.

Figure 7 is a diagrammatic view showing a portion of a modified form of the electric circuit of the toaster.

In the several figures of the drawings, like reference numerals indicate like parts.

Figure 1:
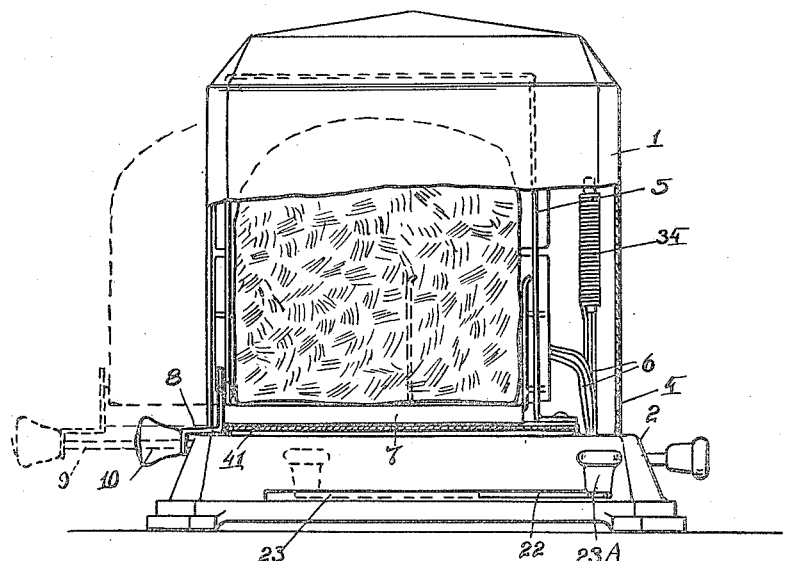
Figures 2, 3:
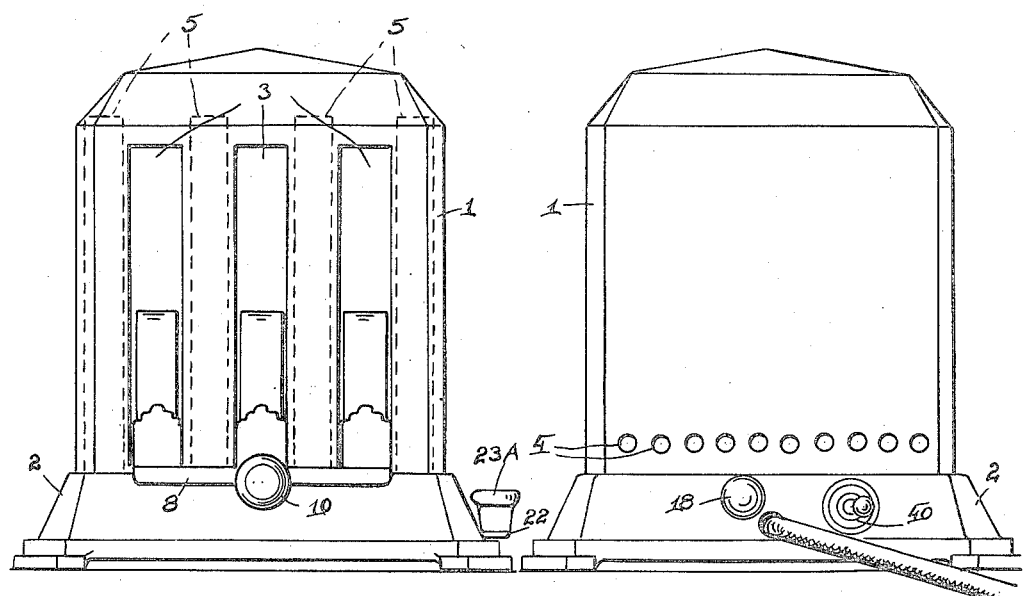
Figure 2 is a front elevation of the toaster.
Figure 3 is a rear elevation of the toaster.

The multiple bread toaster forming the subject matter of our present invention is adapted to partially eject the hot toast at such time as the operator wishes to use it and in this respect differs from the so-called automatic toaster in which the heating units are definitely "shut off" and the toast is instantly ejected at the end of the desired toasting operation. In a modified form, however, our toaster can be made to partially eject the toast after a predetermined time interval.

As illustrated in the drawings, the toaster comprises the housing or oven 1 which is suitably mounted on a hollow base 2 preferably made up of heat insulating material. The housing or oven is closed at the top, bottom and sides. The front of the housing is provided with the large vertical openings 3, 3 for the insertion of the slices of bread and the withdrawal of the toast and the back of the housing is provided with the ventilating holes 4, 4.

Within the housing are mounted four vertically arranged heating units 5, 5 and these are spaced so as to be located one on each side of the vertical openings 3, 3 of the housing. The wires 6, 6 which connect the electric circuit to these heating units lead from the hollow interior of the base 2 thru suitable holes in the bottom of the housing and are connected to the heating units at the rear thereof as illustrated in Figure 1. The toast carrier on which the slices of bread are supported while they are being toasted comprises a series of three parallel supporting members 7, 7 which are joined and held spaced at the front by the connecting member 8. The operating rod 9 for the toast carrier is fastened to the middle of the connecting member 8 on the under side thereof and a handle 10 is threaded to this rod 9 at the front of the connecting member for the manual movement of the toast carrier.

The heat for the operation of the toaster is controlled by a suitable clock mechanism which is mounted in the hollow interior of the base 2 and is indicated by reference numeral 11. This clock mechanism forms no part of our present invention but it is provided with a control arm 12 and an operating arm 13 which project from the clock mechanism so that the operating mechanism of the switch and the releasing mechanism can be operated and controlled thereby as will hereinafter be described.

The electric switch 14 is mounted to one side of the clock mechanism as illustrated in Figures 4 and 5 and is operated thereby in conjunction with the regulating and releasing mechanism of the toaster. However the switch proper forms no part of our invention.

A link 13A connects the operating arm 13 of the clock mechanism with the switch arm 15 which is pivoted at 16 on the switch 14. The control arm 12 of the clock mechanism has the link 17 pivotally attached thereto and this link extends to the outside of the base of the housing 2 and carries the handle 18. The link 17 is thus adapted to be moved in and out of the base 2 and in doing so swings the control arm 5 to the position at which it sets the clock mechanism for the operation of the switch and the release mechanism at the desired time.

The switch 14 is provided with the terminals 19 and 20 and the connecting member 21 of the switch provides a direct electrical connection between these two terminals when it is in the position illustrated in Figure 4. This direct electrical connection is broken between these two terminals when the connecting member is moved into the position illustrated in Figure 5. The swinging of the switch arm 15 to the right causes the connecting member 21 to move to the direct connecting position and the swinging of the switch arm to the left causes the connecting member 21 to open the direct connection between the terminals by moving it into the position illustrated in Figure 5.

Attached to the switch arm 15 and forming a continuation thereof is the combined releasing and resetting arm 22. This arm extends thru a slot 23 in the side of the base 2 and carries a handle 23A with which the arm is manually operated. Within the hollow base the arm 22 is provided with the laterally projecting lug 23 which operates the resetting and releasing mechanism that will now be described.

This mechanism comprises a guide channel 24 which is located at the underside of the closed top of the base and in this guide channel is mounted to slide the bolt 25. At the front end this bolt has fastened thereto the inner end of the operating rod 9 of the toast carrier heretofore described. The operating rod extends thru the middle of the front wall of the base 2 and is bent to one side within the base so as to engage into a suitable hole in the bolt 25 to be fastened thereto by means of the set screw 26. The bolt 25 carries the resetting pin 27 which projects thru the slot 27A in the guide channel 24 and is adapted to move back and forth therein. An anchoring pin 28, carried by the bolt 25, projects thru a suitable slot in the side of the guide channel and to this anchoring pin is anchored one end of the combined tension and cushioning spring 29. The other end of this spring is fastened into the sleeve 30 so that a portion of the spring is confined within this sleeve. The spring 29 is a combined tension and compression spring; that is the coils of the tension spring are normally spaced so that after the tension of the spring has spent itself on its normal contraction, the coils of the spring can be further contracted by compressing them. In order to prevent the spring from bulging to one side on the compression thereof, the spring is surrounded by the sleeve 30 which keeps its coils in line with each other.

Located on another side of the guide channel 24 is the spring latch 31. This latch is made up in the form of a leaf spring and it is fixedly mounted at one end to permit the free end thereof to exert a yielding pressure. At the free end the spring latch is provided with a laterally projecting dog 32 which projects thru a suitable hole in the side of the guide channel 24 into the latch opening 33 provided in the side of the bolt 25.

The bolt 25 is moved into the guide channel by means of the combined resetting and releasing arm 22 which engages with its back the resetting pin 27 and moves this pin from one end of the slot 27A to the other end thereof during its movement from the extreme left hand dotted position to the extreme right hand dotted position illustrated in Figure 4. During this movement of the resetting arm the bolt 25 is moved into the guide sleeve against the tension of the spring 29. When the end position of the bolt is reached, the dog 32 of the spring latch 31 engages into the latch opening 33 of the bolt 25, as above described, and holds it locked in this position against the tension of the spring 29, thus leaving the resetting arm free to be operated and moved back by the clock mechanism toward its starting point.

On the movement of the resetting arm 22, as above described, the toast carrier is moved by the bolt 25 and the operating rod 9 into the housing or oven 1 so as to locate the slices of bread which have been placed thereon between the heating units within the housing.

The resetting arm moves with it the switch arm 15 and this causes the connecting member 21 of the switch to be moved into the position illustrated in Figure 4 for the operation of the heating units. On the movement of the switch arm 15 by the resetting arm 22, the operating arm 13 of the clock mechanism is moved with it and by previously setting the control arm 12 by means of the handle 18, the clock mechanism is set to release the control arm 13 at a predetermined time to allow the combined resetting and switch arm to return to a position at which the switch is again operated, this time into the position illustrated in Figure 5.

As illustrated in the diagram of Figure 6, a small heating coil 34 with a corresponding small current consumption is shunted across the terminals of the switch 14 so that when the switch is open this coil is connected in series with the heating units. The current for the operation of this heating coil 34 is so small that its passage thru the heating units 5 will produce no appreciable heating effect therein and cause these heating units to be substantially inactive. While the toasting operation is thus terminated on the operation of the switch 14, the heating of the inside of the oven continues thru the small heating coil 34 and keeps the toast warm while it remains in the oven. The heating coil 34 is located in the back of the housing or oven 1 behind the heating units as illustrated in Figure 1. In the partial diagrammatic view illustrated in Figure 7 the auxiliary heating unit 34 has been omitted.

At the point where the operating arm 13 of the clock mechanism operates the switch arm to open the switch 14, the switch arm has moved to a position in which the lug 23 of the resetting arm 22 rests on the spring latch 31. This arrests a further independent movement of the resetting arm 22. At this point the toasting operation has been completed, and as above described, only a small heating unit for heating the inside of the oven remains active. The toast is thus ready to be removed at any time and in order to do so the resetting arm 22 is slightly moved by hand to the left against the yielding resistance of the spring latch 31 until the dog 32 thereof is forced out of the latch opening 33 in the bolt 25. The bolt is thus released and the spring 29 draws it to the left and moves its operating rod 9 to draw the toast carrier partially out of the openings in the housing and expose a portion of the slices of the toast supported thereon for the removal thereof.

The movement of the toast carrier is accelerated and decelerated so as to prevent the toast from being thrown out of the carrier on the release thereof. The acceleration and deceleration of the toast carrier are produced by the spring 29 which slowly moves the heavy bolt 25 from a standstill. The spring is made so that as soon as the bolt is in motion, the tension thereof has spent itself. The momentum of the bolt then compresses the spring with the result that the bolt is gradually brought to a standstill.

If it is desired to have the toast carrier operate at the end of the toasting operation without having to manually release the bolt 25, as above described, the tension of the spring latch 31 may be made light enough so that as soon as the lug 23 of the resetting arm makes contact therewith on the release of it by the clock mechanism, the spring latch is moved thereby and causes the dog 32 to release the latch.

A second switch 40 is provided for the toaster and is mounted in the base 2 at the rear thereof. This switch is connected in the electric circuit of the toaster as illustrated in the diagram in Figure 6 so that two of the four heating units may be cut out whenever it is desired to toast but one slice of bread. The two active units in this case are located one on each side of one of the openings in the housing so as to toast a single slice of bread when inserted into this opening by the toast carrier.

As illustrated in Figure 1 the toast carrier rests on a platform 41 mounted on top of the base 2 within the oven 1. This platform is supported and spaced from the base so as to provide a horizontal air pocket between it and the base in order to additionally heat insulate the interior of the base from the oven. This keeps the operating mechanism within the base from becoming too hot and an efficient cool operation of the mechanism is thus secured at all times.

The handle 10, threaded to the operating rod of the toast carrier, is readily removable therefrom so that the toast carrier can be removed from the rod and taken out of the oven for cleaning by the simple removal of this handle.

We claim: —

1. In a toaster the combination of an oven having an opening in the front thereof, a hollow base having an imperforate closed top separated from said oven by its closed top, a toast carrier adapted to slide in and out of the opening in the front of said oven, an operating member projecting from the hollow base and connected to said toast carrier on the outside of the oven and operating means within said hollow base for moving said operating member.

2. In a toaster the combination of an oven heated by a plurality of heating units, a toast carrier movable in and out of said oven, locking means for holding said toast carrier in one position, an electric switch for controlling the electric current for said heating units, a time controlled mechanism for operating said switch, spring means for moving said toast carrier in one direction and means for manually releasing said locking means to have said spring means move said toast carrier after the operation of said switch by said time controlled mechanism.

3. In a toaster the combination of an oven, a plurality of heating units for toasting bread within said oven, a heating unit for heating the oven after the bread has been toasted, a toast carrier adapted to move in and out of said oven in close proximity to said toasting heating units and remotely from said oven heating unit and control means for reducing the electric current to the toasting heating units and causing said toasting heating units to become inactive for toasting purposes and supplying electric current to the said oven heating unit for heating purposes.

4. A toaster as claimed in claim 3 having locking means for locking said toast carrier into said oven and releasing means for releasing said toast carrier on the heating of said oven by said oven heating unit.

5. In a toaster the combination of an oven, a toast carrier adapted to move in and out of said oven, a sliding bolt member rigidly connected to said toast carrier to form an integral part thereof and increase the moving mass thereof, guiding means for said bolt member and single spring means mounted and arranged to move and retard said bolt member and the toast carrier.

6. In a toaster the combination of an oven, a toast carrier adapted to move in and out of said oven in a substantially straight horizontal movement, a sliding member carried by said toast carrier, an arm for manually moving said sliding member in its movement in one direction, locking means for locking said sliding member and its toast carrier into the oven at the end of their movement, and means carried by said arm to operate said locking means and release said sliding member and said toast carrier in its movement in the opposite direction.

7. A toaster as set forth in claim 6 including time controlled means for moving said arm for its releasing movement and spring means for moving said carrier out of said oven on the release thereof by said locking means.

8. In a toaster the combination of an oven having an opening therein, a toast carrier projecting into said oven from the outside thereof and adapted to move in and out of the oven, a sliding bolt in the bottom of said oven for moving said toast carrier, connecting means connecting said bolts with said toast carrier on the outside of said oven, guide means for guiding said bolt and with it said toast carrier in a straight line movement in and out of said oven, a manually operated arm for moving said bolt and the toast carried in one direction, and spring means for moving said bolt and the toast carrier in the opposite direction.

9. A toaster as set forth in claim 8 including locking means for locking said bolt with the toast carrier located in the oven and releasing means carried by said arm for releasing said locking means.

10. In a toast carrier the combination of an oven, a hollow base for said oven, a toast carrier adapted to move in and out of said oven, operating means in said hollow base and connecting means connecting said toast carrier with said operating means on the outside of said base and said oven to provide a minimum heat conduction from said oven into said base thru said connecting means.

11. In a toaster the combination of an oven, heating units mounted within said oven, a toast carrier mounted to slide in and out of the front of said oven relative to said heating units, a sliding bolt connected to said toast carrier on the outside of said oven for operating said toast carrier, a switch for said heating unit and time controlled means for releasing said bolt and operating said switch to shut off said heating unit and simultaneously release said toast carrier and an imperforate partition separating said sliding bolt, switch and time controlled means from said oven.

12. In a toaster having an oven the combination of a toast carrier adapted to move in and out of said oven, a sliding bolt attached to said toast carrier, manually operated means for moving said toast carrier and sliding bolt in one direction, a coil spring connected to said sliding bolt so as to cause its expansion by said bolt in its movement in said one direction, means for holding a number of the coils of said spring in line with each other to cause the inertia of said bolt on the movement thereof by said spring to compress the coils of the spring held in line with each other so as to cushion the movement of the bolt at the end of its movement by said spring after said spring has spent its force.

WILLIAM B. CONNOLLY.
ABE O. SAMUELS.